United States Patent
Pflaum et al.

(10) Patent No.: US 10,040,365 B2
(45) Date of Patent: Aug. 7, 2018

(54) METHOD FOR MANAGING POWER IN A CHARGING STATION FOR ELECTRIC VEHICLES

(71) Applicant: Schneider Electric Industries SAS, Rueil-Malmaison (FR)

(72) Inventors: Peter Pflaum, Meylan (FR); Mazen Alamir, Saint Martin d'Heres (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 30 days.

(21) Appl. No.: 15/358,994

(22) Filed: Nov. 22, 2016

(65) Prior Publication Data
US 2017/0166074 A1  Jun. 15, 2017

(30) Foreign Application Priority Data

Dec. 10, 2015 (FR) ...................................... 15 62113

(51) Int. Cl.
*B60L 11/18* (2006.01)
*H02J 7/00* (2006.01)

(52) U.S. Cl.
CPC ......... *B60L 11/1844* (2013.01); *H02J 7/0021* (2013.01)

(58) Field of Classification Search
CPC ............................ B60L 11/1844; H02J 7/0021
USPC ........................................................ 320/109
See application file for complete search history.

(56) References Cited

U.S. PATENT DOCUMENTS

| 8,232,763 B1 | 7/2012 | Boot | |
|---|---|---|---|
| 2013/0278225 A1* | 10/2013 | Dietze et al. | ....... B60L 11/1862 320/137 |
| 2014/0167678 A1 | 6/2014 | Guillou et al. | |
| 2014/0340038 A1 | 11/2014 | Toggenburger | |
| 2015/0145478 A1 | 5/2015 | Sun et al. | |

FOREIGN PATENT DOCUMENTS

| CN | 202256537 U | 5/2012 |
|---|---|---|
| CN | 103400203 A | 11/2013 |
| CN | 103400203 B | 7/2016 |

OTHER PUBLICATIONS

French Preliminary Search Report dated Sep. 19, 2016 in French Application 15 62113 filed on Dec. 10, 2015 (with English Translation of Categories of Cited Documents).

* cited by examiner

*Primary Examiner* — Sun Lin
(74) *Attorney, Agent, or Firm* — Oblon, McClelland, Maier & Neustadt, L.L.P

(57) ABSTRACT

A method for managing power in a charging station for charging electric vehicles, the charging station including several charging points, the method is used to predict accurately a consumption of the charging station, with satisfaction of clients. The method includes determining a statistic model of occupation of the charging station, determining some scenarios of occupation of the charging station, take into account the statistic model, determining, for each power profile among many power profiles, some scenarios which are valid and some other scenarios which are non-valid, taking in account client satisfaction rate, selecting an optimum power profile among said many power profiles for which a number of non-valid scenarios does not exceed a predefined threshold.

8 Claims, 2 Drawing Sheets

METHOD FOR MANAGING POWER IN A CHARGING STATION FOR ELECTRIC VEHICLES

TECHNICAL FIELD

The present invention relates to a method for managing power in a charging station for electric vehicles. The invention also relates to the system which allows said method to be carried out.

PRIOR ART

The electricity network is not yet suitable for managing the charging of electric vehicles. Today, as the number of vehicles present is still low, it is not absolutely essential to provide the power to be allocated to a charging station. However, the increase in the number of electric vehicles and the emergence of constraints in terms of electric power consumption could make it necessary to anticipate the power requirement of a charging station for electric vehicles and provide a better management of its power consumption.

Solutions have already been proposed to meet the power requirement of a charging station. Solutions of this type have been described, for example, in the documents referenced CN104064829A, CN103400203A, CN202256537U, U.S. Pat. No. 8,232,763B1.

The different proposed solutions are not satisfactory because they are often imprecise and unsuitable for the uncertainties linked to the occupancy level of the charging station and the variation in this occupancy level throughout a day. In fact, for a charging station, the time when a vehicle is connected for charging and the time when this vehicle will depart once more after a determined charging duration are not known in advance.

The object of the invention is to propose a method for managing power in a charging station for electric vehicles which allows a consumption profile of the station to be provided in a precise manner so that to the manager of the supply network can anticipate the electric power requirement in an optimum manner. In particular, the method according to the invention allows the stochastic nature of the occupancy level of each charging terminal of the station to be taken into account throughout a day.

DESCRIPTION OF THE INVENTION

This object is achieved by a method for managing power in a charging station for electric vehicles, said charging station comprising a plurality of charging terminals, said method comprising the following steps:
determining, for the charging station, a statistical occupancy model for said station,
determining occupancy scenarios for the charging station matching said determined statistical occupancy model,
determining a plurality of power profiles to be applied to the charging station, each power profile being sampled over a plurality of successive time intervals of a predefined time period,
applying each power profile to each identified occupancy scenario by distributing the power available in each time interval of the power profile among the electric vehicles connected to the charging station over said time interval,
for each power profile applied to a determined occupancy scenario, comparing a satisfaction rate obtained in relation to a predefined threshold, said satisfaction rate being determined by taking account of an obtained final charging level and a duration of connection of each electric vehicle for charging purposes, in order to determine whether the occupancy scenario is valid,
selecting an optimum power profile from the power profiles for which the number of non-valid occupancy scenarios does not exceed a predefined threshold.

According to one particular feature of the method according to the invention, the available power is distributed equally among all connected electric vehicles.

According to another particular feature, the available power is distributed by taking account of the duration of connection of each electric vehicle.

According to another particular feature, each power profile is defined on the basis of a set of parameters having a determined dimension.

According to another particular feature, the power profile is selected by taking account of a performance index.

According to another particular feature, the performance index is linked to a minimization of the consumption prediction error.

According to another particular feature, the performance index is linked to the limitation of the maximum size of the power profile.

The invention also relates to a system for managing power in a charging station for electric vehicles, said charging station comprising a plurality of charging terminals, said system comprising:
a module for determining, for the charging station, a statistical occupancy model for said station,
a module for determining occupancy scenarios for the charging station matching said determined statistical occupancy model,
a module for determining a plurality of power profiles to be applied to the charging station, each power profile being sampled over a plurality of successive time intervals of a predefined time period,
a module for applying each power profile to each identified occupancy scenario by distributing the power available in each time interval of the power profile among the electric vehicles connected to the charging station over said time interval,
for each power profile applied to a determined occupancy scenario, a module for comparing a satisfaction rate obtained in relation to a predefined threshold, said satisfaction rate being determined by taking account of an obtained final charging level and a duration of connection of each electric vehicle for charging purposes, in order to determine whether the occupancy scenario is valid,
a module for selecting an optimum power profile chosen from the power profiles for which the number of non-valid occupancy scenarios does not exceed a predefined threshold.

BRIEF DESCRIPTION OF THE FIGURES

Other characteristics and advantages will become evident from the following detailed description, given with reference to the attached drawings, in which.

DETAILED DESCRIPTION OF AT LEAST ONE EMBODIMENT

Figure 1:
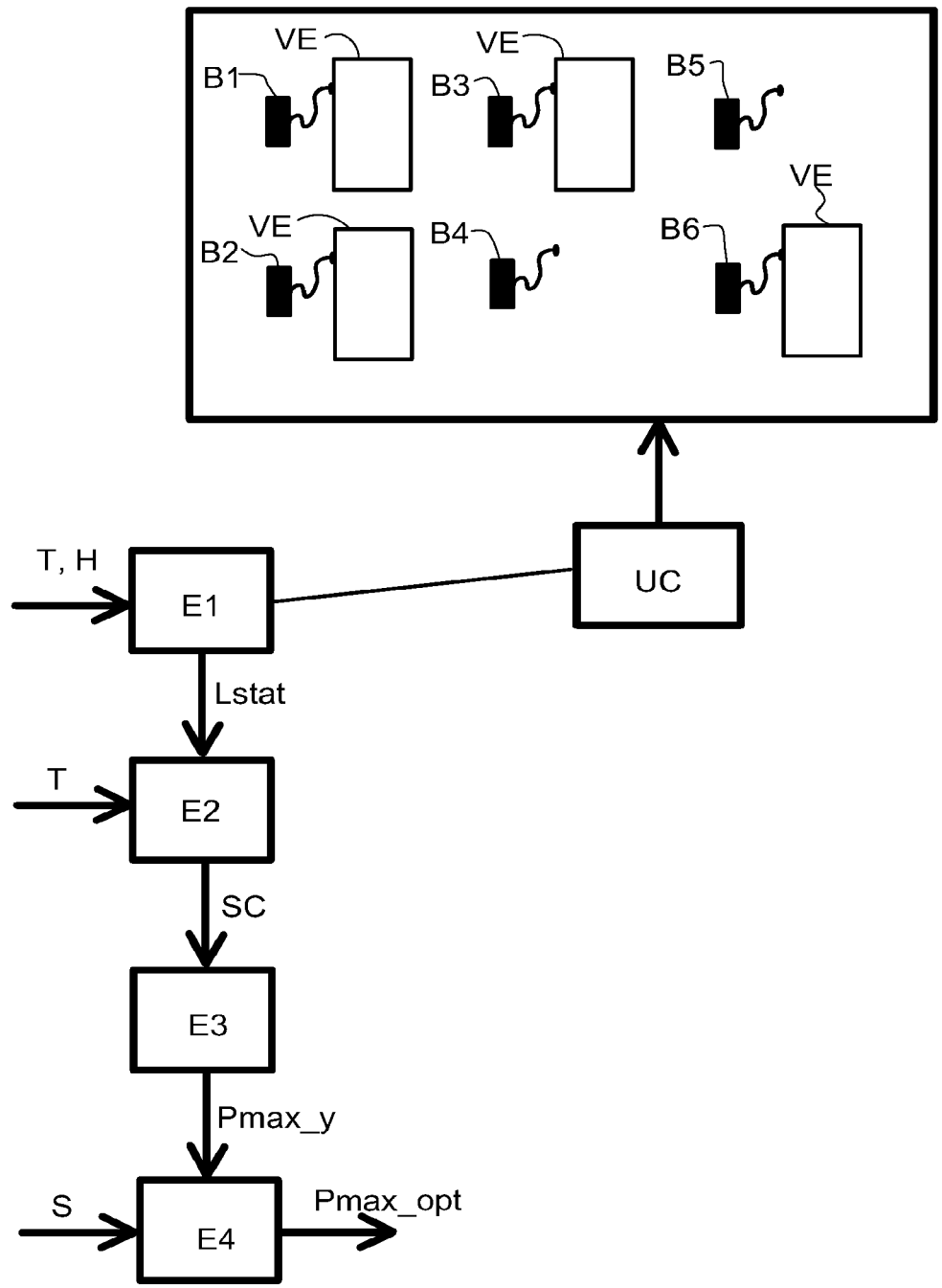
FIG. 1 shows schematically the algorithm of the management method according to the invention.

The invention aims to propose a method for managing power in a charging station 1 for electric vehicles VE, the charging station comprising a plurality of separate charging terminals Bx (x ranging from 1 to n according to the size of the station—in FIG. 1, x=6). The charging terminals Bx may be disposed in the same location or may be dispersed. The charging station is supplied by an electricity network.

The aim of the method according to the invention is to provide the power necessary for a charging station 1 to operate over a determined time period T. In the description below, a time period T of one day (from midnight to midnight) will be considered, but it must be understood that the invention can be applied to a different time period. The chosen time period T will, for example, be divided into a plurality of successive time intervals of equal duration. The day will thus be divided into a plurality of successive fifteen-minute intervals. A different division could obviously be imagined, according to the envisaged application.

The method according to the invention consists in implementing an algorithm comprising a plurality of steps. The management method is, for example, implemented by a management system comprising at least one processing unit UC. The steps of the method will, for example, be implemented by one or more software modules run by the processing unit UC.

The steps of the management method according to the invention are described below. They are implemented for the purpose of determining a power profile Pmax_opt to be applied to a charging station for electric vehicles which takes account of the uncertainties linked to the occupancy level of the charging station 1, while maintaining a determined customer satisfaction level.

A first step E1 of the method consists in determining the statistical laws which describe the occupancy of the charging station.

For each charging terminal of the station, a statistical model of its occupancy is constructed which comprises the following information for each vehicle which is connected to the terminal:
  time of connection of the vehicle to the network,
  time of disconnection from the network for the vehicle,
  quantity of power required by the vehicle during its connection.

Although all this information is not known in real time, it nevertheless follows certain known statistical laws, such as, for example, Gaussian laws.

The statistical laws that describe the occupancy of the charging terminals of the charging station throughout one day are preferably determined on the basis of stored and available historical data H. A learning period is implemented for a duration sufficient to determine the occupancy variation of the charging station. The learning period may apply to each charging terminal or to all of the charging terminals of the station.

Following this learning procedure, the processing unit determines the statistical occupancy law followed by each charging terminal of the station. For the continuing description of the management method according to the invention, the occupancy of each terminal Bx of the charging station will be assumed to follow the same statistical law, denoted Lstat.

Once the statistical law Lstat has been identified for each charging terminal of the station, the management method according to the invention implements a second step E2 which consists in generating the occupancy scenarios SC for the charging station 1 over the chosen period T, i.e. over the day.

The generated scenarios SC are those that allow compliance with the statistical law Lstat determined for each terminal. Each scenario SC comprises the occupancy level of the station over each time interval of the day, this occupancy level being determined on the basis of the time of connection and the time of disconnection of each vehicle and the initial state of charge of each vehicle being connected to the station throughout the day, derived from the statistical law Lstat.

Each selected scenario SC must meet a criterion linked to the customer satisfaction guarantee probability. The selected number N of scenarios SC is determined by means of probabilistic algorithms (randomized algorithms) according to the following formula:

$$N \geq \frac{1}{\eta}\left(\frac{e}{e-1}\right)\left(\ln\frac{n_\theta}{\delta} + m\right)$$

This relation corresponds to the number N of scenarios which allows guaranteed performances to be obtained, these guaranteed performances being defined by the following parameters:
  η corresponds to a stochastic parameter representing the probability that, for a given scenario, the charging strategy does not succeed, i.e. it represents the probability of non-satisfaction of the customer,
  δ corresponds to a stochastic parameter representing the degree of confidence (defined by 1−δ) assigned to the probability of non-satisfaction of the customer defined by η,
  m corresponds to a selection threshold of a power profile Pmax_y (see below), this threshold being the number of scenarios for which it is accepted that the number of satisfied customers is not greater than a determined threshold,
  $n_\Theta$ represents the cardinality of a set of parameters, described below.

The two parameters η and δ are thus linked to the customer satisfaction guarantee probability.

Figure 2:
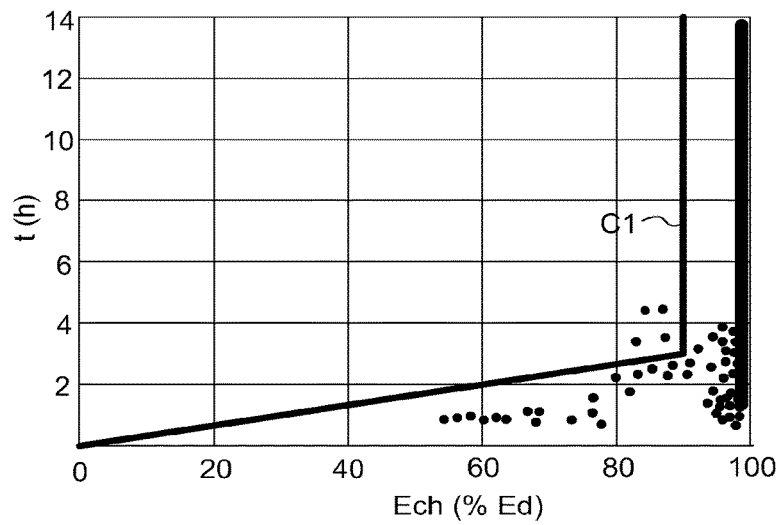
FIG. 2 shows the customer satisfaction principle used in the management method according to the invention.

FIG. 2 shows the customer satisfaction principle. A customer will be deemed to be satisfied if his vehicle has been charged sufficiently in relation to the initial charging requirement. Thus, a charging station occupancy scenario will be deemed to be valid if, at the end of the day, the number of satisfied customers within the meaning of the definition above is greater than a determined threshold. FIG. 2 shows, on the x-axis, expressed as a percentage, the relationship between the power Ech obtained over the duration of charging of the vehicle and the required power Ed during the connection, and, on the y-axis, the duration t (expressed in hours) of connection of the vehicle. Each point thus corresponds to the level of charge of a vehicle obtained at the end of its connection period in relation to the level of charge required at the time of the connection. It is understood that the longer the vehicle remains charging, the higher the percentage will be. In this FIG. 2, the curve C1 shows the applied satisfaction limit. This satisfaction limit corresponds to the charging thresholds S beyond which the customers will be satisfied according to an applied charging duration.

On the basis of the occupancy scenarios for the charging station, the processing unit then determines, in a third step E3, the power profiles Pmax_y, where y ranges from 1 to n, n corresponding to the number of profiles that match the identified scenarios SC.

The power profiles Pmax_y are defined, for example, on the basis of a multi-dimensional parameter. The dimension of the parameter must be the smallest possible, but it must be sufficient to obtain a profile having a sufficient variability so that it best represents the profile of the real consumption of the charging station 1 throughout the day (T).

Figure 3:
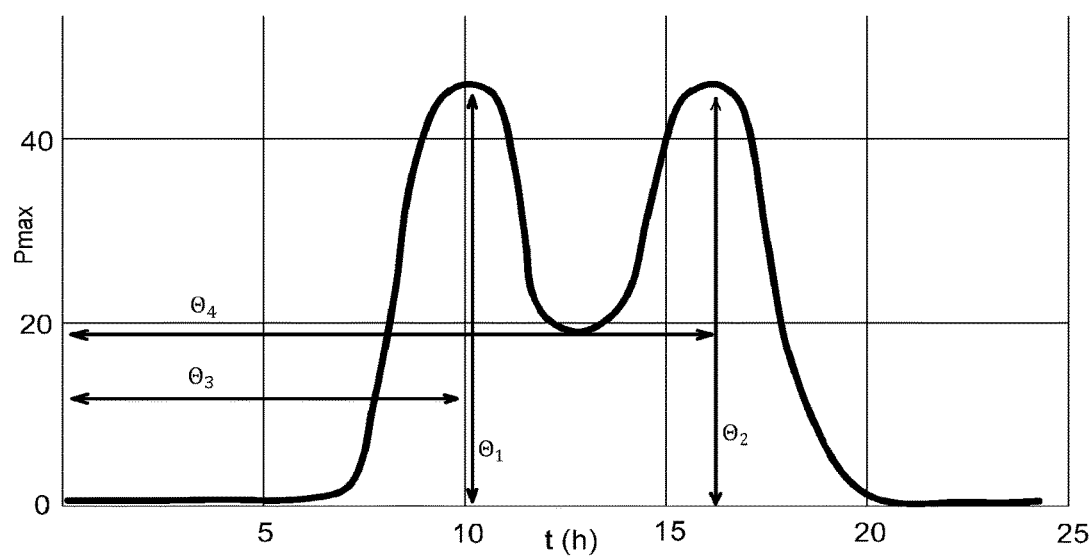
FIG. 3 shows an example of a power profile which it is possible to apply in the management method according to the invention.

FIG. 3 shows an example of a power profile Pmax_y applicable over one day. This figure shows that this profile can be defined on the basis of a set of parameters $\Theta$ having a dimension $n=4$. In order to limit the number of profiles Pmax_y to be passed through by the algorithm, a discrete set (having the cardinality $n_\Theta$) of possible values for the multi-dimensional parameter must be chosen. For the profile shown, the following, for example, applies:

$\Theta\_1=\{0.7,0.9,1.1\}$ $\Theta\_2=\{0.7,0.9,1.1\}$ $\Theta\_3=\{0.9,1.0,1.1\}$ $\Theta\_4=\{0.9,1.0,1.1\}$ The cardinality $n_\Theta$ of this set of parameters would then be $n_\Theta=3^4=81$.

In a fourth step E4, the processing unit UC determines the power profile Pmax_opt that will best match the occupancy scenarios SC identified in step E2, wherein the processing unit UC proceeds in the following manner:

It selects a power profile by defining a set of parameters $\Theta$ as described above.

For each occupancy scenario SC for the charging station 1, the processing unit UC distributes the power defined by the selected profile according to the time division that is used. As described above, the day has been divided, for example, into successive fifteen-minute time intervals. Over each fifteen-minute time interval, the available power defined by the profile is distributed among the different charging terminals Bx of the station. The processing unit UC preferably determines the power distributed to each charging terminal by proceeding in the following manner, for each time interval:

the processing unit determines the number of connected vehicles and divides the available power defined by the selected power profile over the time period by the number of vehicles, if some vehicles have a state of charge that is sufficiently high so that they do not need the quantity of power that has been allocated to them, the processing unit performs a reallocation of the power by prioritizing the vehicles according to their duration of connection to a charging terminal.

Once the processing unit UC has applied the power profile to each scenario, it determines the variable scenarios, i.e. those for which the number of satisfied customers is greater than a predefined threshold. A customer is deemed to be satisfied if, at the end of his connection duration, the level of charge (Ech) of his vehicle exceeds the threshold S defined by the curve C1 in FIG. 2 (i.e. if his point is located to the right of the curve C1).

If the number of non-valid scenarios does not exceed the threshold m defined above, the selected power profile is assumed to match the scenarios SC.

The processing unit UC restarts these operations for the 81 power profiles corresponding to the cardinality of the set of parameters $\Theta$ having a dimension $n=4$.

The processing unit UC then chooses the optimum power profile Pmax_opt from all the power profiles tested by the processing unit UC and validated during the preceding step. The choice of the optimum profile Pmax_opt is made, for example, by taking account of a performance index. This performance index may be different according to the application. Two different examples of a performance index that can be applied in the choice of the power profile are as follows:

minimization of the prediction error. By taking account of this index, the processing unit UC determines the power profile that will most closely match the real consumption, minimization of the consumption peaks. By taking account of this index, the processing unit chooses the power profile for which the maximum size is the smallest.

The solution according to the invention thus offers many advantages, including:

a high precision in the prediction of the charging curve (Pmax_opt) compared with other existing solutions, since it takes account, in particular, of the occupancy level of the station over each time interval of the day, a customer satisfaction that is guaranteed, according to the defined satisfaction limit, a high flexibility, since the charging strategy can be adapted to different constraints: those linked to customer satisfaction, those linked to the electricity network management operator or to the manager of the station.

The invention claimed is:

1. A method for managing power in a charging station for electric vehicles, said charging station comprising a plurality of charging terminals, said method comprising the following steps:

determining, for the charging station, a statistical occupancy model for said charging station;

determining occupancy scenarios for the charging station matching said determined statistical occupancy model;

determining a plurality of power profiles to be applied to the charging station, each power profile being sampled over a plurality of successive time intervals of a predefined time period;

applying each power profile to each identified occupancy scenario by distributing available power in each time interval of said each power profile among the electric vehicles connected to the charging station over said each time interval;

for each power profile applied to a determined occupancy scenario, comparing a satisfaction rate obtained in relation to a predefined threshold, said satisfaction rate being determined by taking into account an obtained final charging level and a duration of connection of each electric vehicle to the charging station for charging purposes, in order to determine whether the determined occupancy scenario is valid; and selecting an optimum power profile from the plurality of power profiles for which a number of non-valid occupancy scenarios does not exceed a predefined threshold.

2. The method according to claim 1, wherein the available power is distributed equally among all electric vehicles connected to the charging station.

3. A method according to claim 1, wherein the available power is distributed by taking into account the duration of connection of each electric vehicle to the charging station.

4. The method according to claim 1, wherein each power profile is defined based on a set of parameters having a determined dimension.

5. The method according to claim 1, wherein each power profile is selected by taking into account a performance index.

6. The method according to claim 5, wherein the performance index is linked to a minimization of a consumption prediction error.

7. The method according to claim 5, wherein the performance index is linked to a limitation of a maximum size of each power profile.

8. A system for managing power in a charging station for electric vehicles, said charging station comprising a plurality of charging terminals, said system comprising:
- a module for determining, for the charging station, a statistical occupancy model for said charging station;
- a module for determining occupancy scenarios for the charging station matching said determined statistical occupancy model;
- a module for determining a plurality of power profiles to be applied to the charging station, each power profile being sampled over a plurality of successive time intervals of a predefined time period;
- a module for applying each power profile to each identified occupancy scenario by distributing available power in each time interval of said each power profile among the electric vehicles connected to the charging station over said time each interval;
- for each power profile applied to a determined occupancy scenario, a module for comparing a satisfaction rate obtained in relation to a predefined threshold, said satisfaction rate being determined by taking into account an obtained final charging level and a duration of connection of each electric vehicle to the charging station for charging purposes, in order to determine whether the determined occupancy scenario is valid; and
- a module for selecting an optimum power profile chosen from the plurality of power profiles for which a number of non-valid scenarios does not exceed a predefined threshold.

* * * * *